US006965209B2

(12) United States Patent
Jones et al.

(10) Patent No.: US 6,965,209 B2
(45) Date of Patent: *Nov. 15, 2005

(54) METHOD AND SYSTEM FOR ROBOT LOCALIZATION AND CONFINEMENT

(75) Inventors: Joseph L. Jones, Acton, MA (US); Philip R. Mass, Denver, CO (US)

(73) Assignee: IRobot Corporation, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/921,775

(22) Filed: Aug. 19, 2004

(65) Prior Publication Data

US 2005/0067994 A1 Mar. 31, 2005

Related U.S. Application Data

(60) Continuation of application No. 10/696,456, filed on Oct. 29, 2003, now Pat. No. 6,781,338, which is a division of application No. 10/056,804, filed on Jan. 24, 2002, now Pat. No. 6,690,134.

(60) Provisional application No. 60/263,692, filed on Jan. 24, 2001.

(51) Int. Cl.[7] .......................... G05B 19/10; B25J 5/00; B25J 19/02; B25J 19/00
(52) U.S. Cl. ............ 318/567; 318/568.12; 318/568.16; 318/587; 701/210; 901/1; 901/46; 901/47; 180/167; 180/168; 180/169
(58) Field of Search .......................... 318/567, 568.12, 318/568.16, 587, 580; 901/1, 46, 47; 701/22–28, 701/301, 200, 210; 180/167–169

(56) References Cited

U.S. PATENT DOCUMENTS

| 4,679,152 A | 7/1987 | Perdue |
| 4,777,416 A | 10/1988 | George, II et al. |

(Continued)

FOREIGN PATENT DOCUMENTS

| WO | WO 95/26512 | 10/1995 |
| WO | WO 99/28800 | 6/1999 |
| WO | WO 00/38029 | 6/2000 |

OTHER PUBLICATIONS

Gat, Erann, "Robust Low-Computation Sensor-Driven Control for Task-Directed Navigation," Proceedings of the 1991 IEEE International Conference on Robotics and Automation, Sacremento, CA, Apr. 1991, pp. 2484-2489.

(Continued)

Primary Examiner—Marlon T. Fletcher
Assistant Examiner—Patrick Miller
(74) Attorney, Agent, or Firm—Gesmer Updegrove LLP

(57) ABSTRACT

The present invention discloses a system and method for confining a robot to a particular space. The system includes a portable barrier signal transmitter that produces a barrier signal primarily along an axis, and a mobile robot capable of avoiding the barrier signal upon detection of the barrier signal. In the preferred embodiment the barrier signal is emitted in an infrared frequency and the robot includes an omni-directional signal detector. Upon detection of the signal, the robot turns in a direction selected by a barrier avoidance algorithm until the barrier signal is no longer detected.

6 Claims, 12 Drawing Sheets

U.S. PATENT DOCUMENTS

| | | | |
|---|---|---|---|
| 5,165,064 A | 11/1992 | Mattaboni | |
| 5,787,545 A | 8/1998 | Colens | |
| 6,255,793 B1 | 7/2001 | Peless et al. | |
| 6,339,735 B1 | 1/2002 | Peless et al. | |
| 6,493,612 B1 | 12/2002 | Bisset et al. | |
| 6,690,134 B1 * | 2/2004 | Jones et al. | 318/567 |
| 6,781,338 B2 * | 8/2004 | Jones et al. | 318/567 |
| 2004/0111184 A1 * | 6/2004 | Chiappetta et al. | 700/245 |

OTHER PUBLICATIONS

Schofield, Monica, "'Neither Master Nor Slave . . . ' A Practical Study in the Development and Employment of Cleaning Robots," Emerging Technologies and Factory Automation, 1999. Proceedings. EFA '99. 1999 7$^{th}$ IEEE International Conference on Barcelona, Spain, Oct. 18-21, 1999, pp. 1427-1434.

* cited by examiner

METHOD AND SYSTEM FOR ROBOT LOCALIZATION AND CONFINEMENT

CROSS REFERENCE TO RELATED APPLICATIONS

This application is related to and claims priority from U.S. Nonprovisional patent application Ser. No. 10/696,456, filed Oct. 29, 2003 now U.S. Pat. No. 6,781,338, which claims the benefit of priority from U.S. Nonprovisional patent application Ser. No. 10/056,804, filed Jan. 24, 2002 now U.S. Pat. No. 6,690,134, which claims the benefit of priority from U.S. Provisional Application Ser. No. 60/263,692, filed Jan. 24, 2001.

BACKGROUND OF THE INVENTION

The invention relates to a method and system for robot localization and confinement.

There have been many systems proposed in the prior art for confining a robot to specific physical space for the purpose of performing work. These systems are typically designed for any number of robotic applications such as lawn care, floor cleaning, inspection, transportation, and entertainment, where it is desired to have a robot operate in a confined area for performing work over time.

By way of example, a vacuuming robot working in one room may unintentionally wander from one room to another room before satisfactorily completing the vacuuming of the first room. One solution is to confine the robot to the first room by closing all doors and physically preventing the robot from leaving the first room. In many houses, however, open passageways often separate rooms, and doors or other physical barriers cannot easily be placed in the robot's exit path. Likewise, a user may desire to only have the robot operate in a portion of a single open space and, therefore, letting the robot work in the entire room decreases efficiency.

It is therefore advantageous to have a means for confining the area in which a robot works.

One approach in the prior art is to provide sophisticated systems for navigation and orientation for the robot such that the robot either travels along a predetermined path and/or monitors its current location against a map stored in memory. These systems require sophisticated hardware, such as precision sensors and significant computer memory and computational power, and typically do not adapt well to changes in the area in which the robot is working. Likewise the robot cannot simply be taken from one building to another building, or even from room-to-room, without significant reprogramming or training.

For example, the method disclosed in U.S. Pat. No. 4,700,427 (Knepper) requires a means for generating a path for the robot to travel, which can be either a manually-controlled teaching of the path or automatic mapping function. If "the place of use is frequently changed" or the "rooms are modified," large amounts of data memory is required in order to store information related to each location. Similarly, the method and system disclosed in U.S. Pat. No. 4,119,900 (Kremnitz) requires powerful computation and sensors to constantly ascertain the orientation of the robot in a given space. Other examples of robotic systems requiring inputted information about the space in which the robot is working include methods and systems shown in U.S. Pat. No. 5,109,566 (Kobayashi et al.) and U.S. Pat. No. 5,284,522 (Kobayashi et al.).

Similarly, certain prior art systems not only require the training or programming of the robot to the specifics of a particular space, but also require some preparation or alteration to the space in which the robot is to work. For example, U.S. Pat. No. 5,341,540 (Soupert et al.) discloses a system in which in a preferred embodiment requires the robot to include a positioning system and that the area for the robot be set up with "marking beacons . . . placed at fixed reference points." While this system can avoid an unknown obstacle and return to its preprogrammed path through signals from the beacons, the system requires both significant user set-up and on-board computational power.

Similar systems and methods containing one or more of the above-described disadvantages are disclosed in U.S. Pat. No. 5,353,224 (Lee et al.), U.S. Pat. No. 5,537,017 (Feiten et al.), U.S. Pat. No. 5,548,511 (Bancroft), and U.S. Pat. No. 5,634,237 (Paranjpe).

Yet another approach for confining a robot to a specified area involves providing a device defining the entire boundary of the area. For example, U.S. Pat. No. 6,300,737 (Bergvall et al.) discloses an electronic bordering system in which a cable is placed on or under the ground to separate the inner area from the outer area. Likewise, the system disclosed in U.S. Pat. No. 6,255,793 (Peless et al.) requires installation of a metallic wire through which electricity flows to define a border. While these systems provide an effective means for confinement, they are difficult to install, are not portable from room-to-room, and can be unsightly or a tripping hazard if not placed under ground or beneath carpeting. Equally important, such systems can be difficult to repair if the wire or other confinement device breaks, as the location of such breaks can be difficult to determine when the system is placed underground or under carpet.

The present invention provides a modified and improved system for confining a robot to a given space without the drawbacks of the prior art.

SUMMARY OF THE INVENTION

In accordance with the present invention a robot confinement system is disclosed comprising: a portable barrier signal transmitter, wherein said barrier signal is transmitted primarily along an axis, said axis defining a barrier; a mobile robot, where said mobile robot comprises means for turning in at least one direction, a barrier signal detector, and a control unit controlling said means for turning; whereby the control unit runs an algorithm for avoiding said barrier signal upon detection of said barrier signal, said algorithm comprising the step of turning the robot until said barrier signal is no longer detected.

Accordingly, the present invention has several objects and advantages.

It is an object of the invention to provide a simplified and portable system and method for confining a robot to a given area.

It is an object of the invention to provide a confinement system that does not require installation.

It is an object of the invention to provide a barrier system that can be set up intuitively and includes a means for visually indicating the barrier.

It is an additional object of the invention to provide a system such that a robot approaching the barrier from either side of the barrier will turn in such a way as to avoid crossing the barrier.

It is an object of the invention to provide a robot confinement system that operates regardless of the angle at which the robot approaches the barrier.

It is an additional object of a preferred embodiment of the invention to provide a system that is substantially impervious to the effects of sunlight, will not cause interference with other devices, and will not be interfered by other devices.

The preferred embodiment of the present invention is for a robotic, indoor cleaning device similar to the types disclosed in U.S. Pat. No. 4,306,329 (Yokoi), U.S. Pat. No. 5,293,955 (Lee), U.S. Pat. No. 5,369,347 (Yoo), U.S. Pat. No. 5,440,216 (Kim), U.S. Pat. No. 5,613,261 (Kawakami et al.), U.S. Pat. No. 5,787,545 (Colens), U.S. Pat. No. 5,815,880 (Nakanishi), U.S. Pat. No. 6,076,226 (Reed). One of skill in the art will recognize that the present invention can be used in any number of robotic applications where confinement is desired. In addition, while the preferred embodiments described herein are for a robot without a navigation system, one of skill in the art will recognize the utility of the invention in applications using more sophisticated robots.

Other features and advantages of the invention will be apparent from the following detailed description, including the associated drawings, and from the claims.

DETAILED DESCRIPTION

Figure 1A:
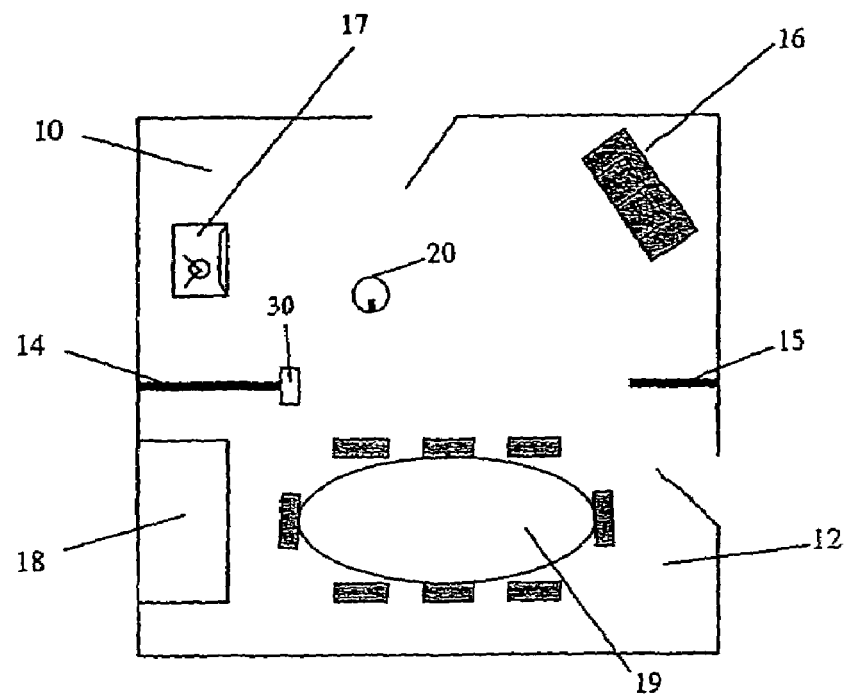
FIG. 1A shows an embodiment of the robot confinement system according to the invention with the barrier signal transmitter in an unpowered state.
Figure 1B:
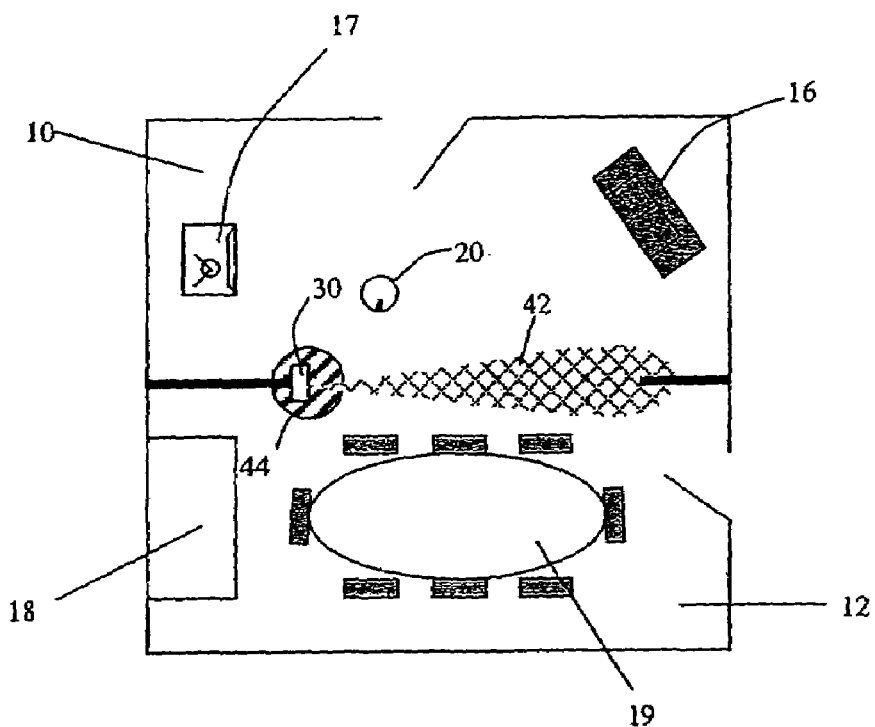
FIG. 1B shows an embodiment of the robot confinement system according to the invention with the barrier signal transmitter in a powered state.

Referring to FIGS. 1A & 1B, living room 10 is shown separated from dining room 12 by interior walls 14 & 15. The living room and/or dining room may contain various furnishings, for example, couch 16, television 17, buffet 18 and table and chairs 19.

The rooms also contain a mobile robot 20 and a barrier signal transmitting device 30, which for purposes of this specification is also called a robot confinement (or RCON) transmitter 30. In FIGS. 1A & 1B, the robot is placed in the living room 10, and the RCON transmitter 30 is placed in the area dividing the living room 10 from the dining room 12, against interior wall 14 and pointing toward interior wall 15.

As described in more detail herein, FIG. 1B shows the same configuration of rooms with the RCON transmitter 30 in a powered state emitting, e.g., an infrared beam 42 from the RCON transmitter 30 toward interior wall 15. The beam 42 is directed primarily along an axis to create a boundary or barrier between living room 10 and dining room 12.

The system and method described herein each rely on a portable RCON transmitting unit 30 and a mobile robot 20. Each of these elements is first described independently, then the operation of a preferred embodiment of the invention is discussed.

RCON Transmitter

Figure 2A:
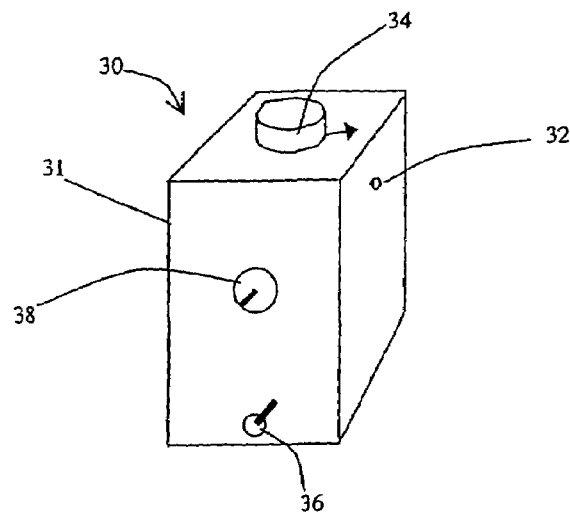
FIG. 2A shows a schematic representation of a preferred embodiment of the barrier signal transmitter.
Figure 2B:
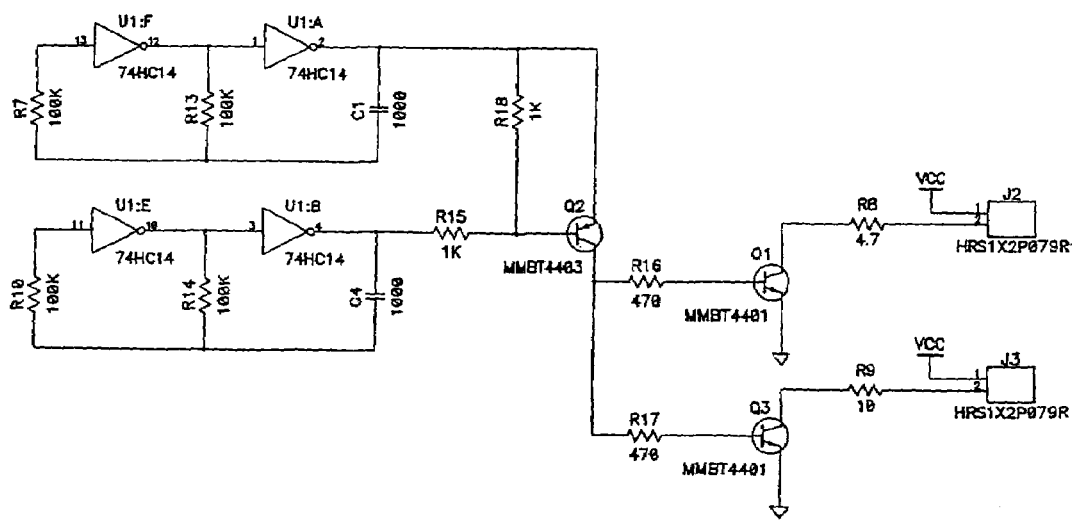
FIG. 2B shows a circuit diagram of a specific embodiment of the barrier signal transmitter.

FIG. 2A illustrates a preferred embodiment of the RCON transmitter 30. The RCON transmitter 30 includes a first infrared emitter 32, a second infrared emitter 34, a power switch 36, and variable power-setting knob 38. The RCON transmitter enclosure 31 also houses the batteries (not shown) and necessary electronics for the various components. FIG. 2B shows a circuit diagram for the necessary electronics for an embodiment of the RCON transmitter 30. Other embodiments may use other conventional power sources.

In the embodiment shown in FIG. 2A, a user would turn on the RCON transmitter 30 using power switch 36 at the same time as the robot 20 begins operation. The user can also select a variable power using knob 38. In other embodiments, any number of known input devices can be used to turn on the unit and/or select a power setting, such as keypads, toggle switches, etc. A higher power can be used to provide a longer barrier useful for dividing a single room, while a lower power setting can be used to provide a barrier for a single doorway. Because of the reflective properties of various materials such as walls painted white, it is preferable to limit the power of the RCON transmitter 30 to the minimum necessary to provide the desired barrier.

In alternative embodiments, the RCON transmitter's power may be automatically turned off after a predetermined amount of time in order to preserve battery life.

In alternative embodiments, a control system can be used to turn on and turn off one or more RCON transmitters and/or robots in order to allow automatic cleaning of multiple rooms or spaces in a controlled manner. For example, a "smart house" control system might communicate directly with one or more RCON transmitters allowing a cycling of work spaces. In the alternative, the robot 20 might send a signal to the RCON to turn it on.

In the preferred embodiment, two infrared emitters 32 & 34 are used. The first IR emitter 32—the primary emitter—is powered to provide a directed barrier 42 of a given length from the RCON transmitter 30. In this embodiment, the beam 42 is a modulated, narrow IR beam. In the preferred embodiment, a collimated IR emitter is used such as Waitrony p/n IE-320H. The specifics of the emitter(s) are left to one of skill in the art; however, as explained in detail below, the beam 42 must have sufficient width. It is preferred that the minimum beam width be greater than the turning radius of the detector on a particular robot.

The second IR emitter 34—the secondary emitter—is powered to provide a diffuse region 44 near the RCON transmitter 30 to prevent robot 20 from crossing the beam 42 in its most narrow region closest to the RCON transmitter 30 and, in addition, prevents robot 20 from coming into direct contact with the RCON transmitter 30. In the preferred embodiment, a lens identical to the lens portion of the RCON detector, described below, is used for the secondary emitter 34. In other embodiments, a single active emitter operatively connected to appropriate optics can be used to create multiple emission points, including the two emitter system disclosed herein.

Because of potential interference from sunlight and other IR sources, most IR devices, such as remote controls, personal digital assistances and other IR communication devices, modulate the emitted signal. Herein, the emitters 32 & 34 modulate the beam at 38 kHz. In addition, IR devices modulate the beam to provide a serial bit stream to the unit being controlled to tell it what to do. In an embodiment of the present invention, additional modulation of the beam at a frequency, for example 500 Hz, different from the frequency of common IR bit streams prevents interference with other IR equipment.

While the preferred embodiment uses an infrared signal, the system and method of the present invention can use other signals such as electromagnetic energy to—accomplish the goals, including radio waves, X-rays, microwaves, etc. Many of these types of waves have significant drawbacks. For example, radio waves are more difficult and expensive to make directional, and visible light suffers from interference from many sources and may be distracting to users. Sound waves could also be used, but it is similarly difficult to make purely directional and tend to scatter and reflect more.

Robot

Figure 3A:
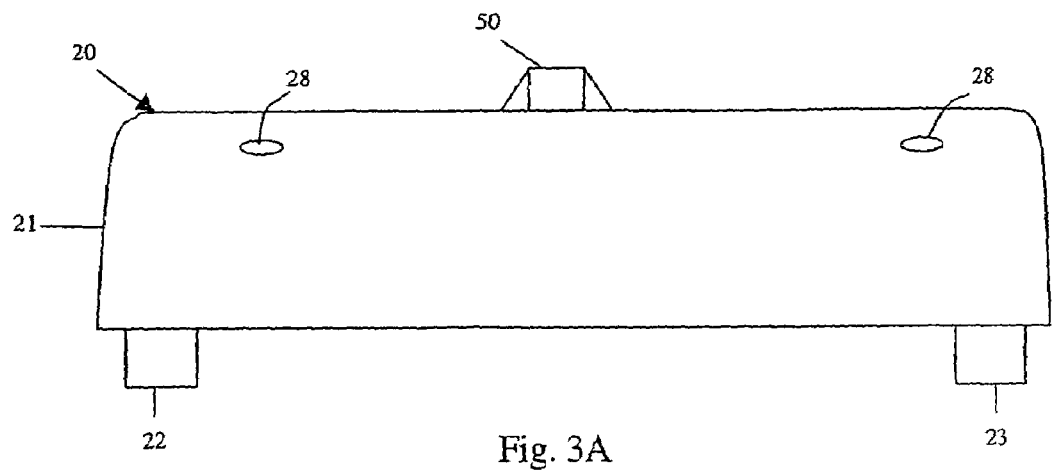
FIG. 3A shows a side-view schematic representation of a mobile robot used in a preferred embodiment of the invention.
Figure 3B:
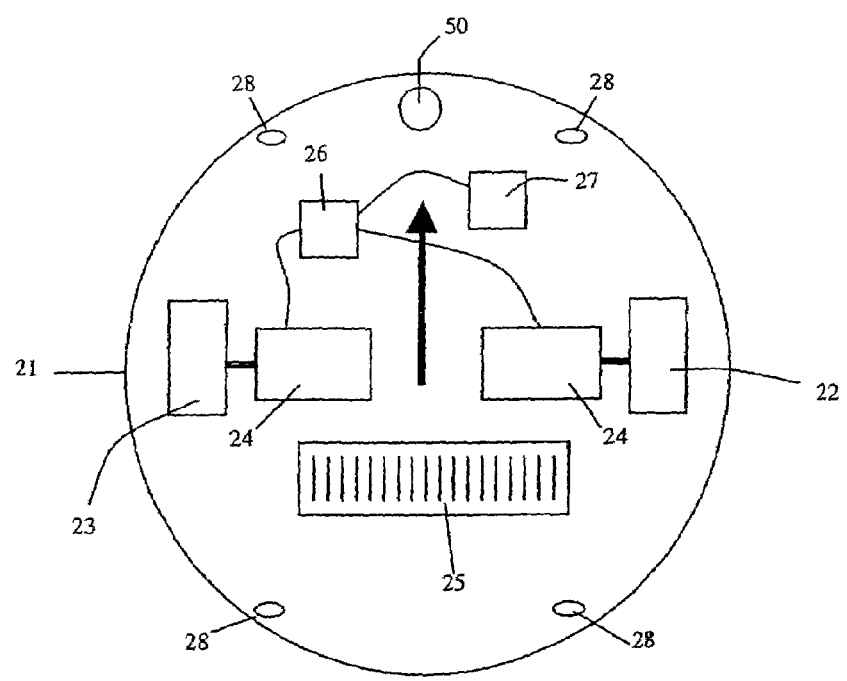
FIG. 3B shows a top-view schematic representation of a mobile robot used in a preferred embodiment of the invention.

As shown in FIGS. 3A & 3B, in the preferred embodiment, the robot 20 comprises a substantially circular shell 21 mounted to a chassis containing two wheels 22 & 23 mounted on opposite sides of a center line, wherein each of the wheels 22 & 23 can be independently driven to allow the robot to turn. In the preferred embodiment, the wheels are mounted in such a manner as to allow the robot to turn substantially in place. The preferred embodiment of the robot 20 also comprises motors 24, cleaning mechanism 25, rechargeable battery 26, microprocessor 27, and various tactile and optical sensors 28.

Figure 5:
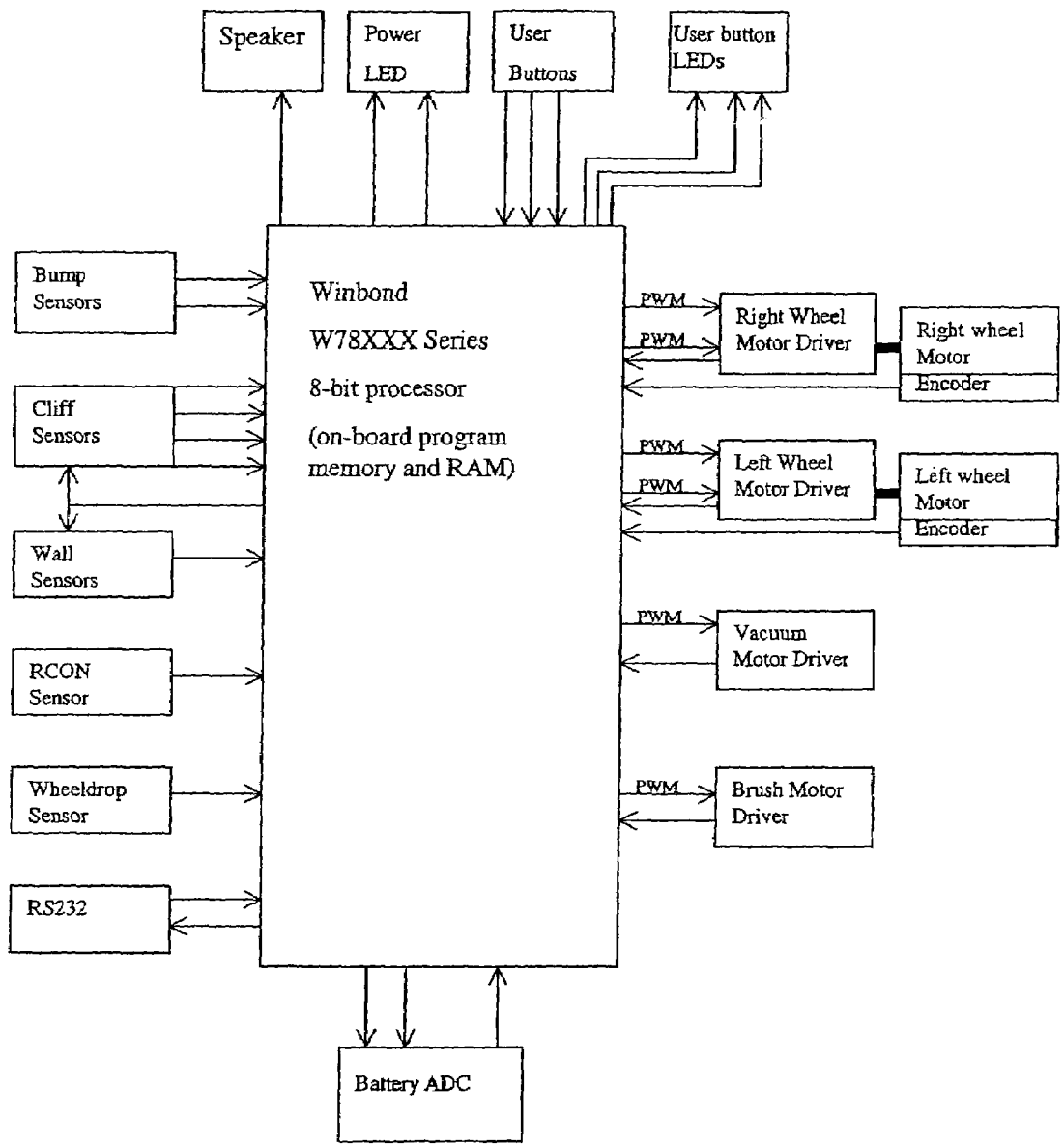
FIG. 5 demonstrates a hardware block diagram of the robot shown in FIGS. 3A & 3B.

In FIG. 5 is illustrated a hardware block diagram of a robot similar to the one shown in FIGS. 3A & 3B. The hardware is built around a Winbond W78 XXX Series 8-bit processor. The processor is controlled by software stored in ROM. The system shown in FIG. 5 includes various control functions and motor drivers, along with various sensors (e.g. physical bump sensors, cliff sensors, the RCON detector/sensor).

For the instant invention, the robot also has an RCON detector 50, which in the preferred embodiment is a standard IR receiver module, which comprises a photodiode and related amplification and detection circuitry, mounted below an omni-directional lens, where omni-directional refers to a single plane. In a preferred embodiment, the IR receiver module is East Dynamic Corporation p/n IRM-8601S. However, any IR receiver module, regardless of modulation or peak detection wavelength, can be used as long as the RCON emitter is also changed to match the receiver. As shown in FIGS. 3A & 3B, the RCON detector is mounted at the highest point on the robot 20 and toward the front of the robot as defined by the primary traveling direction of the robot, as indicated by an arrow in FIG. 3B.

While the RCON detector should be mounted at the highest point of the robot in order to avoid shadows, it is desirable in certain applications to minimize the height of the robot 20 and/or the RCON detector 50 to prevent operational difficulties and to allow the robot 20 to pass under furniture or other obstacles. In certain embodiments, the RCON detector 50 can be spring mounted to allow the detector to collapse into the body of the robot when the robot runs under a solid overhanging object.

Figure 4:
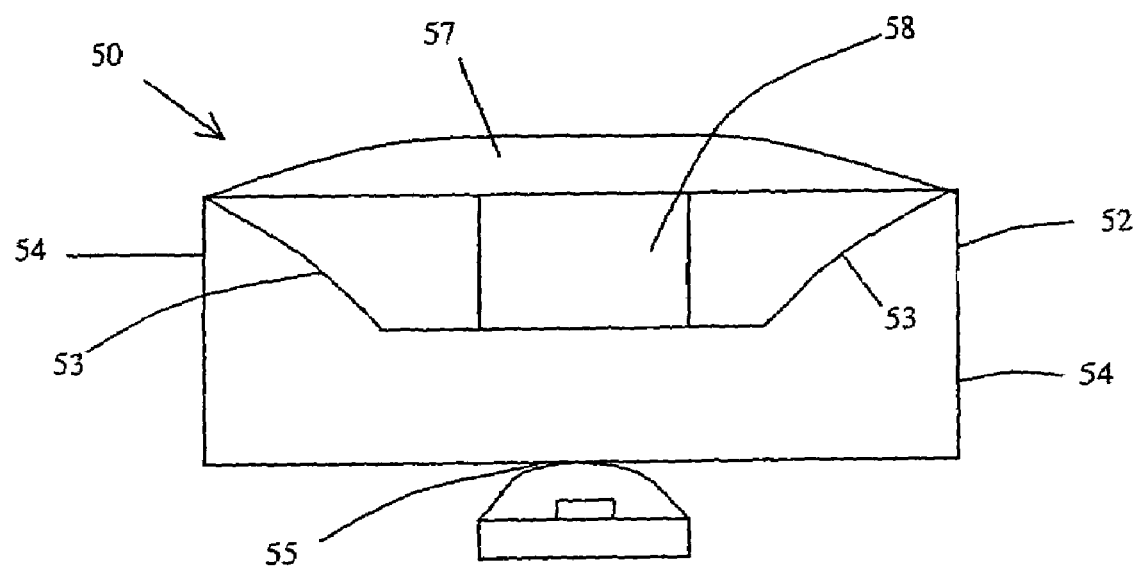
FIG. 4 shows a side-view of a preferred embodiment of an omni-directional barrier signal detector.

FIG. 4 shows in detail the preferred embodiment of the RCON detector 50. The RCON detector 50 includes a lens 52 that allows in the barrier signal (or rays) 42 from all directions through the outer lens wall 54 and focuses the rays at IR detector 55. At the same time, the method and systems of the present invention are likely to be used in the presence of sunlight. Because direct sunlight can easily saturate the IR detector 55, efforts may be made to exclude sunlight from the RCON detector 50. Therefore, in the preferred embodiment, opaque plastic horizontal plate 57 is used, which is supported by post 58.

The lens 52 used in the preferred embodiment is a primarily cylindrical device designed to accept rays perpendicular to the axis of the lens and to reject rays substantially above or substantially below the plane perpendicular to the axis of the lens. The lens focuses horizontal rays primarily on IR detector 55 mounted below the lens.

In the preferred embodiment, the geometry of the lens is determined by rotating a parabola about its focus, where the focus is collocated with the active element of the receiver 55. The inner lens wall 53 is thereby defined by the swept parabola. The rays are reflected by the phenomena called total internal reflection, defined here by the discontinuation between the lens material and the material internal to the inner lens wall 53. The preferred embodiment is constructed of clear polycarbonate chosen for its low cost and index of refraction.

The omni-directional nature of the RCON detector 50 allows a system with only a single RCON detector 50 to function equally well regardless of the angle of incident radiation from the RCON transmitter. If the RCON detector 50 is insensitive to the beams 42 & 44 from certain angles, then the robot 20 can break through the confining beams 42 & 44 when the robot 20 approaches the beam(s) such that the beam(s) occupies the RCON detector 50 blind spot.

In addition, in the preferred embodiment, the RCON transmitter 30 is battery powered. This imposes a high sensitivity requirement on the robot-mounted detector 50 in order to promote long battery life in the emitter 30. As such, the RCON detection system should be designed to gather as much IR as possible from the emitter(s).

The RCON detector of the preferred embodiment is designed to be triggered by modulated IR above a certain intensity threshold. If the IR levels are below the given threshold, the RCON detector computes no detection whatsoever and therefore triggers no specific control commands.

Figure 6:
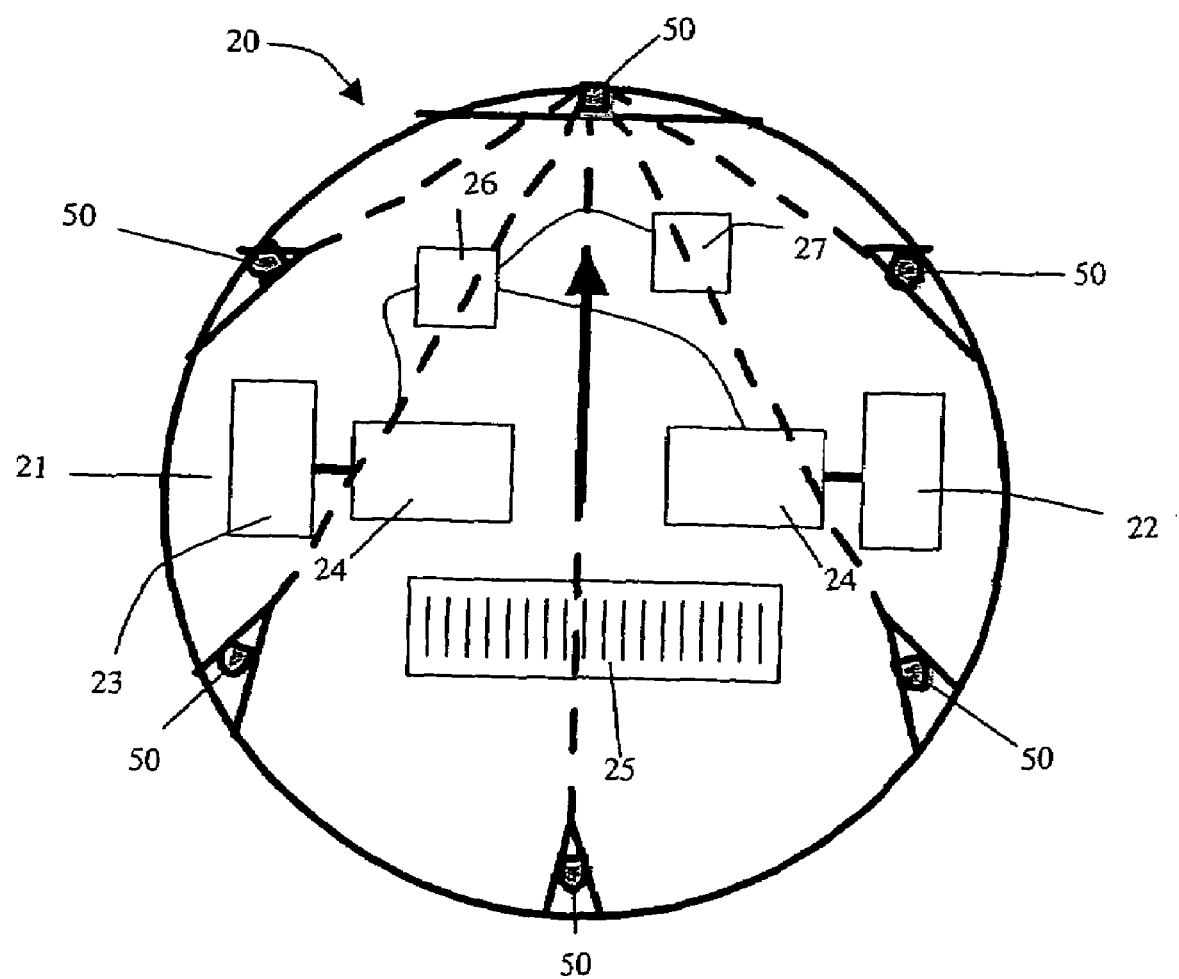
FIG. 6 shows a schematic representation of an alternative embodiment of the robot employing multiple barrier signal detectors.

One of skill in the art will recognize that in alternative embodiments multiple RCON detectors 50 can be used. FIG. 6 illustrates such an embodiment using six side-mounted sensors 50. Each of the sensors should be oriented in a manner to have its field of view correspond to that of the single, top mounted sensor. Because a single, omni-directional RCON detector should be mounted at the highest point of the robot for optimal performance, it is possible to lower the profile of the robot by incorporating multiple detectors.

As disclosed above, the system and method of the present invention can be used with any number of robots existing in the prior art, including those designed for indoor cleaning applications.

Operation of System & Method

Figure 8A:
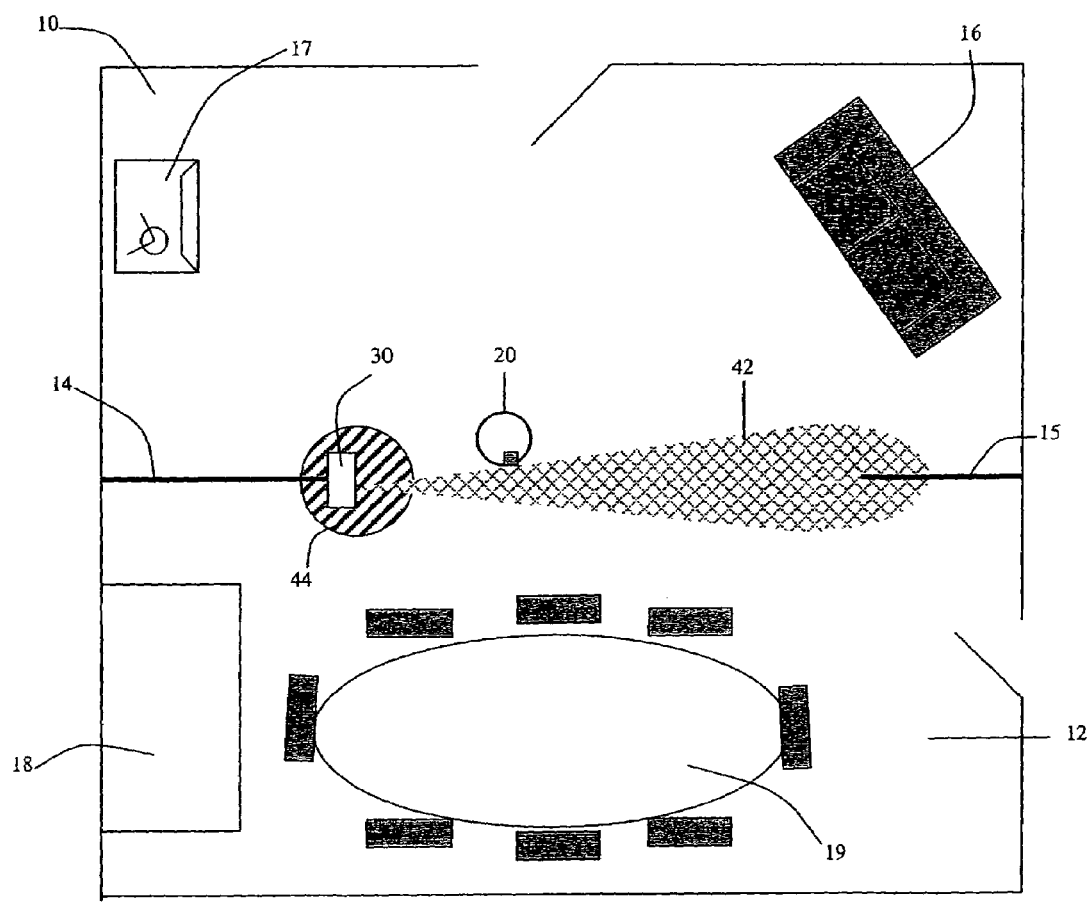
FIGS. 8A–C are schematic illustrations of the system and method of a preferred embodiment of the present invention.
Figure 8B:
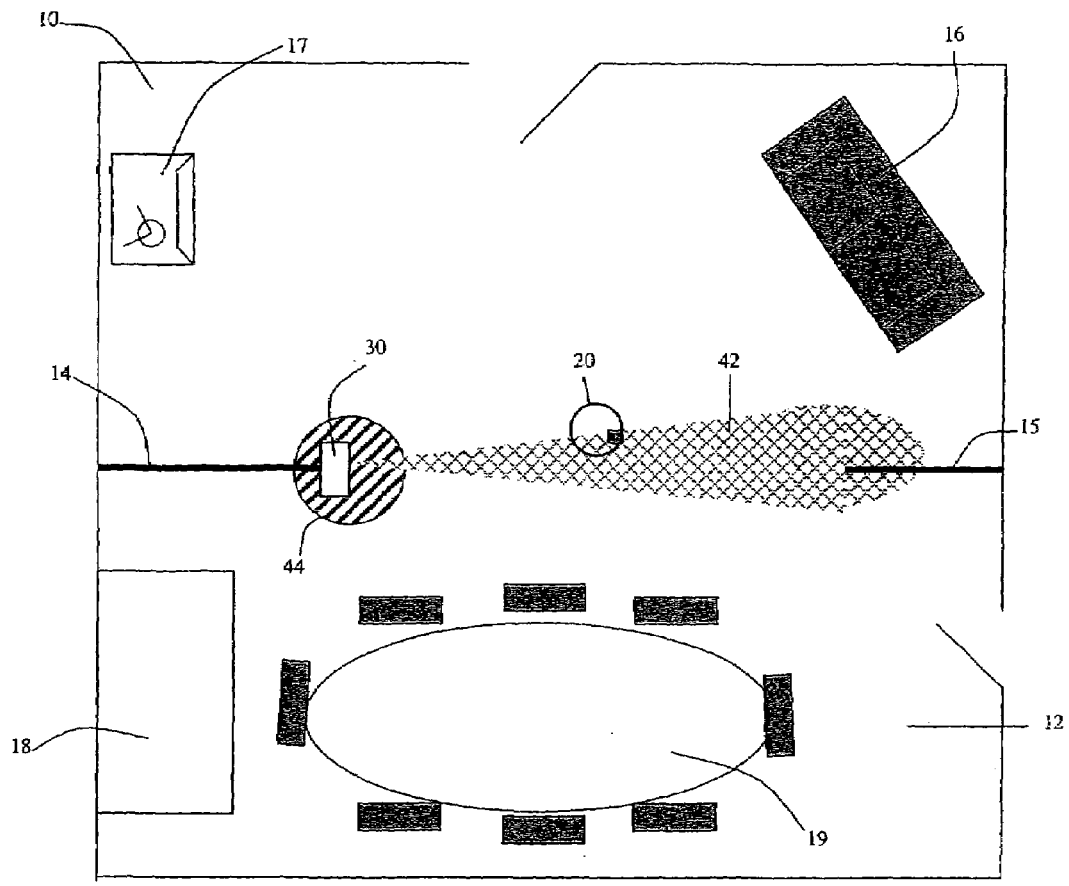
Figure 8C:
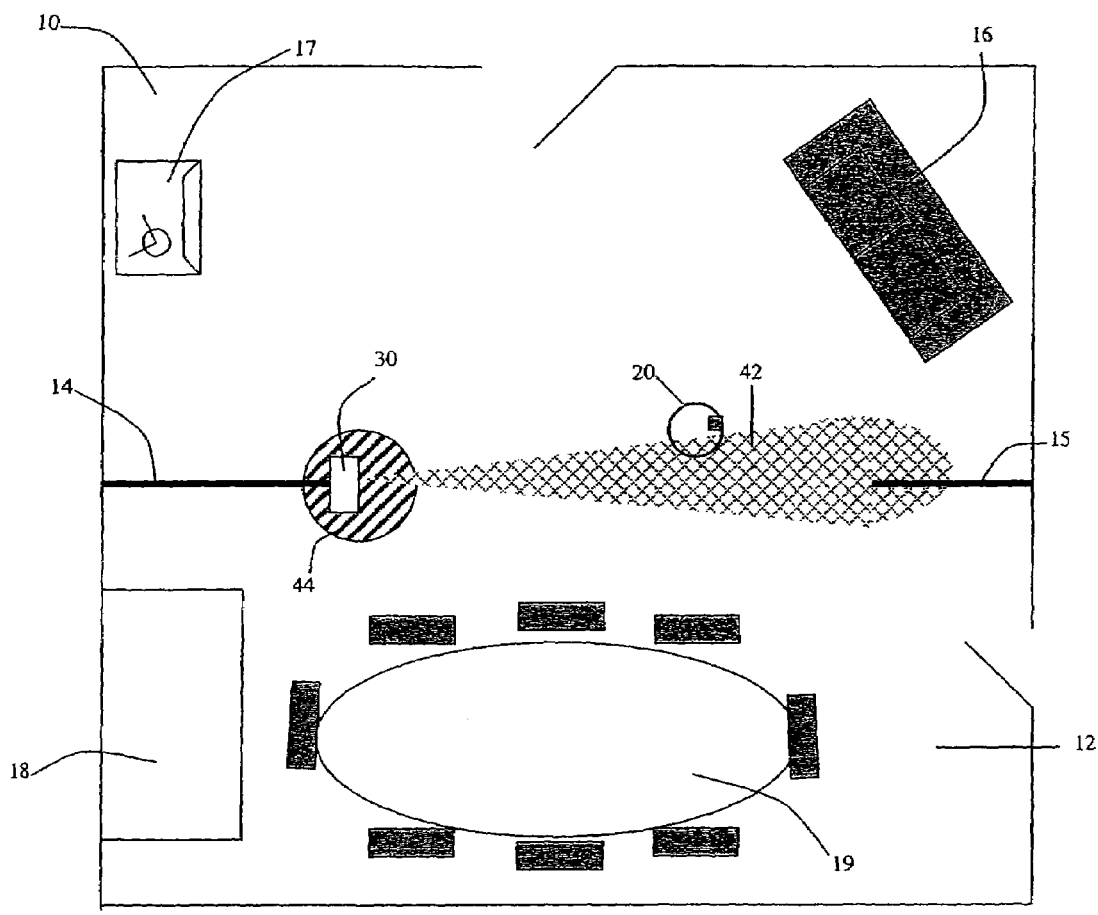

As shown in FIGS. 8A–C, an IR beam is used to divide the space (living room 10 and dining room 12) into two distinct areas. The robot has a RCON detector for detecting this beam 42 mounted at the robot's top front. As seen in FIG. 8B, whenever a measurable level of IR radiation strikes the detector the robot's IR avoidance behavior is triggered. In a preferred embodiment, this behavior causes the robot to spin in place to the left until the IR signal falls below detectable levels (FIG. 8C). The robot then resumes its previous motion. Spinning left is desired in certain systems because, by convention, the robot may attempts to keep all objects to its right during following operations. The robot's confinement behavior is consistent with its other behaviors if it spins left on detecting the confining beam 42. In this embodiment, the RCON detector acts as a gradient detector. When the robot encounters a region of higher IR intensity the robot spins in place. Because the RCON detector is mounted at the front of the robot and because the robot does not move backward, the RCON detector always sees the increasing IR intensity before other parts of the robot. Thus spinning in place causes the RCON detector to translate to a region of decreased intensity. When the robot next moves forward, the robot necessarily moves to a region of decreased IR intensity—away from the beam.

In another preferred embodiment, the room confinement behavior works as a single behavior in a strictly priority based behavior system which controls the robot's motion. Each of the behaviors is assigned a priority, and the behavior with the highest priority requests control of the robot at any given time and has full control of the robot. These behaviors may include driving forward, turning when bumped, spiraling, etc. The confinement behavior is one of the highest priority behaviors. It requests control of the robot when the room confinement IR sensor has detected a signal from a room confinement transmitter.

Figure 7A:
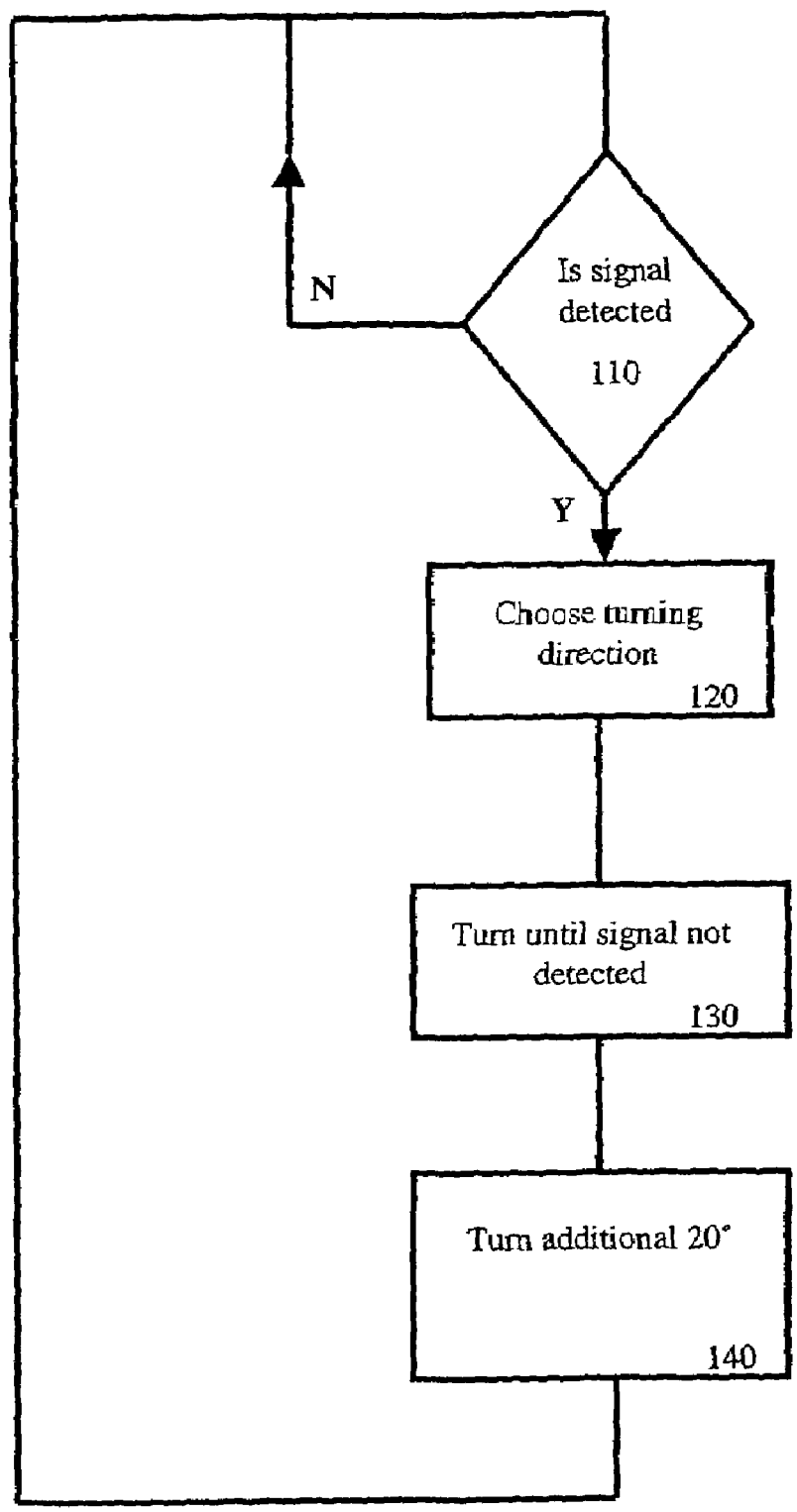
FIGS. 7A & 7B are flow-chart illustrations of the barrier avoidance algorithm of a preferred embodiment of the invention.

A flow-chart of a preferred embodiment of the control logic of the confinement behavior is shown in FIG. 7A. The robot determines whether the RCON detector detects a signal (step 110). If a signal is detected, the robot chooses a turning direction (step 120). The robot then begins to turn in the chosen direction until the signal is no longer detected (step 130). Once the signal is no longer detected, the robot continues turning for an additional distance (step 140).

Figure 7B:
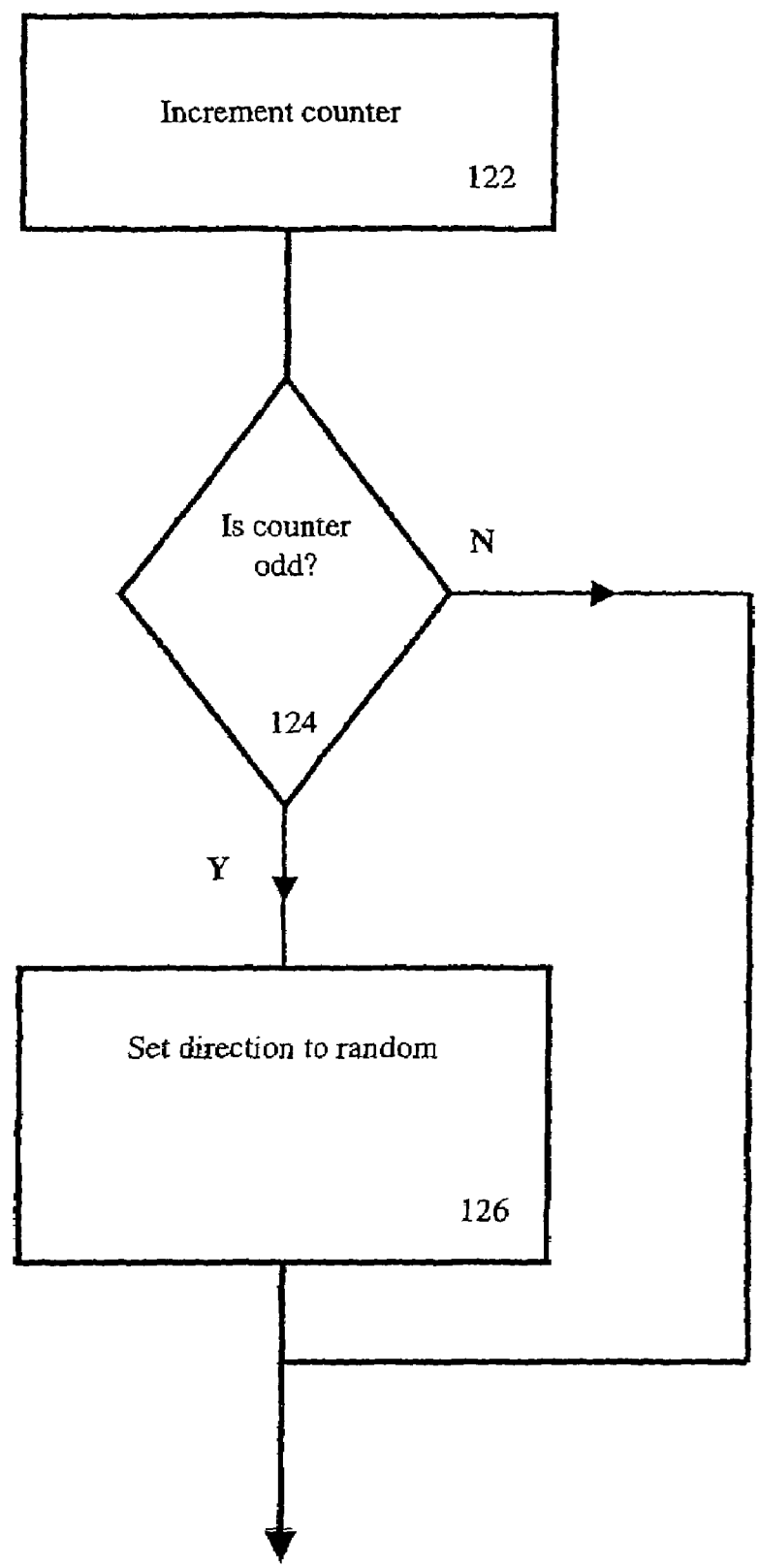

In the preferred embodiment of step 120, the direction is chosen through the algorithm illustrated in the flow chart shown in FIG. 7B. The robot's control logic keeps track of the robot's discrete interactions with the beam. The robot first increments the counter by one (step 122). On odd numbered interactions, the robot chooses a new turning direction randomly (steps 124 & 126); on even numbered interactions, the robot again uses its most recent turning direction.

In other embodiments, the robot can always turn a single direction or choose a direction randomly. When the robot always turns one direction, the robot may get stuck in a loop by turning away from the beam, bumping into another obstacle in a room, turning back toward the beam, seeing the beam again, turning away, bumping again, ad infinitum. Moreover, when the robot only turns in a single direction, it preferentially ends up at one end of the beam. Where the robot's task is to complete work evenly throughout a room, such as cleaning, a single turning direction is not optimal. If the direction is chosen purely randomly, the robot may turn back and forth quite a bit as it encounters the beam more than once.

In the preferred embodiment of step 140, the robot turns an additional 20 degrees from the point at which the signal is lost. The amount of the turn, which was selected arbitrarily in the preferred embodiment, is left to the particular robot and application. The additional turn prevents the robot from re-encountering the confinement beam immediately after exiting the beam. For various applications, the amount of additional movement (linear or turning) can be a predetermined distance or time, or in the alternative may include a random component.

In still other embodiments, the robot's avoidance behavior may include reversing the robot's direction until the beam 42 is no longer detected.

In other embodiments, the RCON detector is able to determine the gradient levels of the beam. This information can be used to send the robot in the direction of the lowest level of detection and prevent the situation where the robot is situated entirely within the beam and therefore turns in 360 degrees without the detector exiting the beam. In these embodiments, if the robot turns 360 degrees without exiting the beam, the control logic may give a higher priority to a "gradient behavior." The gradient behavior divides the possible robot headings into a fixed number of angular bins, each bin covering an equal sweep of the angular area around the robot. The robot then turns at a constant rate while sampling the number of detections in each angular bin. (For a system using infrared signals, detection counts are monotonically related to the signal strength.) After the robot has rotated more than 360 degrees, the gradient behavior commands the robot to turn toward the angular bin with the lowest detection count. When the robot achieves the correct heading, the gradient behavior commands the robot to move forward a predetermined distance, for example one-half of the width of the robot, then control is released from the gradient behavior. If necessary, this process repeats until the robot has moved into a region where IR intensity is below the detection threshold.

One of skill in the art will recognize that the emitter/detector system can also be used to guide the robot in any number of ways. For example, the beam 42 could be used to allow the robot to perform work parallel to the edge of the beam, allowing, for example, the floor right up to the edge of the room confinement beam to be cleaned.

Figure 9A:
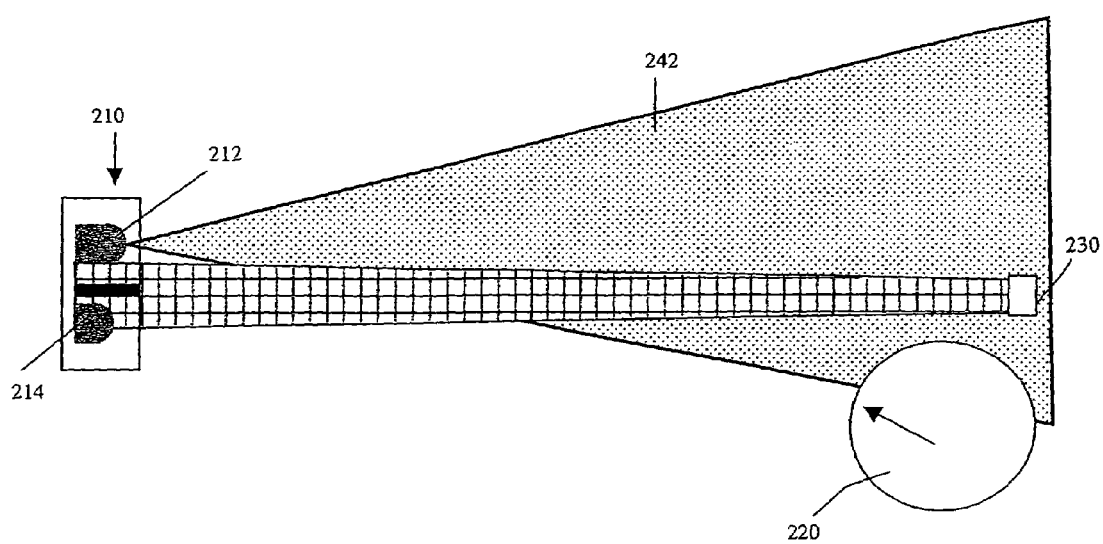
FIG. 9A–B are schematic illustrations of the system and method of an alternative embodiment of the present invention.

In an alternative embodiment of the present invention, the RCON transmitter may comprise both a signal emitter and a signal detector. As shown in FIG. 9A, the RCON transmitter 210 includes both a primary emitter 212 and a detector 214. The RCON transmitter 210 is placed at one end of the desired barrier and a retroreflector 230 is placed at the opposite end of the desired barrier. The retroreflector, which reflects the beam back toward the emitter regardless of the orientation of the retroreflector relative to the beam, can be constructed from, for example, standard bicycle reflectors. As shown in FIG. 9A, primary emitter 212 produces beam 242. A portion of beam 242 reflects from retroreflector 230 and is detected by detector 214.

Figure 9B:
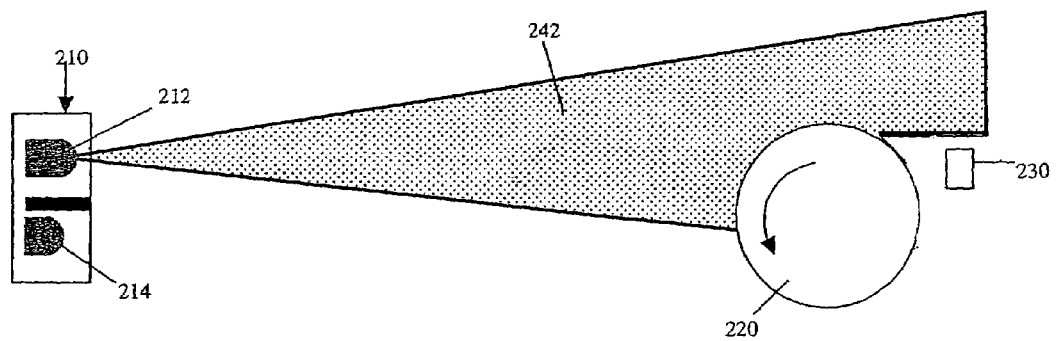

In the embodiment shown in FIGS. 9A & 9B, the IR radiation emitted by the primary emitter 212 can be modulated in either of two ways constituting signal A or signal B. During normal operation, the beam 242 emitted from the primary emitter 212 is reflected by the retro-reflective material 230 back into the detector 214. When this is true the RCON transmitter broadcasts signal A, which is received by robot 220. As shown in FIG. 9B, if the robot or other object comes between the emitter 212 and the retro-reflective material 230 then no signal is returned to the receiver 214 and the RCON transmitter 210 broadcasts signal B, which is received by robot 220. The robot 220 then uses this information to improve its performance. The robot turns away from the beam as described previously only when the robot detects signal B. When the robot detects signal A no action is taken.

For certain applications, the embodiment shown in FIGS. 9A & 9B provides improved performance. For example, in cleaning application, the completeness of cleaning is improved because the robot tends to clean up to the line connecting the confinement device and the retro-reflective material. Also, this embodiment is more resistant to beam blockage. If furniture or other obstacles partially occlude the beam, the robot tends to turn away when it is further from crossing the beam. Finally, an indicator, such as an LED, can be added to the RCON transmitter to indicate when the device is functioning and correctly aimed.

In other embodiments, the RCON transmitter can be used to define an annular confinement region. For example, an RCON transmitter with two omni-directional emitters may be employed, wherein the first emitter would broadcast the standard modulated beam and the second emitter would emit radiation 180 degrees out of phase with the output of the first emitter, but with less power. The robot would be programmed to turn when the IR was not detected. As the robot gets further from the emitter, it would eventually, lose the beam and turn back into it. As it gets closer, the radiation from the second emitter would jam the radiation from the first emitter, creating essentially unmodulated IR. The detector would fail to detect this, and the robot would again turn back into the annulus.

In yet another embodiment, the RCON transmitter can be used as a "home base." For example, once the voltage of the robot's battery drops below a predetermined level, the robot can use the gradient detection behavior to home in on the RCON transmitter. This allows the user to easily find the robot when it has finished cleaning instead of it randomly ending up in corners, under furniture, etc.

Although the description above contain many specificities, there should not be construed as limiting the scope of the invention but as merely providing illustrations of some of the presently preferred embodiments of this invention.

Other embodiments of the invention are within the scope of the following claims.

What is claimed is:

1. A confinement system for a mobile robot having propulsion elements for moving the robot, the confinement system comprising:
   a signal emitter operable to transmit a first beam and a second beam;
   a retro-reflector positionable to reflect at least a portion of the first beam back to the emitter;
   a first signal detector operable to detect the reflected portion of the first beam, the reflected portion of the first beam between the emitter and the retro-reflector defining a confinement barrier;
   the emitter being operable to transmit the second beam when the first signal detector fails to detect the reflected portion of the first beam;
   a second signal detector, adapted for mounting in association with the robot, and operable to detect the second beam; and
   a controller, operable to control the robot's propulsion elements and responsive to detection of the second beam to control the propulsion elements to move the robot to avoid the second beam;
   wherein if operation of the robot causes the reflected portion of the first beam to be blocked such that the first signal detector fails to detect the reflected portion of the first beam, then the emitter is operable to transmit the second beam which, if detected by the second signal detector, causes the controller to control the propulsion elements to move the mobile robot to avoid the second beam.

2. The system of claim 1 wherein the controller controls the propulsion elements to turn the robot in a selected direction until the second beam is no longer detected by the second signal detector.

3. The system of claim 1 wherein the controller controls the propulsion elements to move the robot in a direction opposite to the most recently traveled direction until the second beam is no longer detected by the second signal detector.

4. A method for confining a mobile robot to a prescribed zone, the robot having propulsion elements for moving the robot, the method comprising:
   providing a signal emitter operable to transmit a first beam and a second beam;
   providing a retro-reflector positionable to reflect at least a portion of the first beam back to the emitter;
   providing a first signal detector operable to detect the reflected portion of the first beam, the reflected portion of the first beam between the emitter and the retro-reflector defining a confinement barrier;
   the emitter being operable to transmit the second beam when the first signal detector fails to detect the reflected portion of the first beam;
   providing a second signal detector, adapted for mounting in association with the robot, and operable to detect the second beam; and
   providing a controller, operable to control the robot's propulsion elements and responsive to detection of the second beam to control the propulsion elements to move the robot to avoid the second beam;
   wherein if operation of the robot causes the reflected portion of the first beam to be blocked such that the first signal detector fails to detect the reflected portion of the first beam, then the emitter is operable to transmit the second beam which, if detected by the second signal detector, causes the controller to control the propulsion elements to move the mobile robot to avoid the second beam.

5. The method of claim 4 wherein the controller controls the propulsion elements to turn the robot in a selected direction until the second beam is no longer detected by the second signal detector.

6. The method of claim 5 wherein the controller controls the propulsion elements to move the robot in a direction opposite to the most recently traveled direction until the second beam is no longer detected by the second signal detector.

* * * * *